United States Patent [19]

Bradfield

[11] Patent Number: 5,134,990

[45] Date of Patent: Aug. 4, 1992

[54] BARBECUE BRIQUETTE BOOSTER

[76] Inventor: Athol G. Bradfield, P.O. Box 598, Lions Bay, British Columbia Von 2EO, Canada

[21] Appl. No.: 541,774

[22] Filed: Jun. 21, 1990

[51] Int. Cl.⁵ .............................................. F24B 3/00
[52] U.S. Cl. .................. 126/25 B; 426/25 R
[58] Field of Search ......................... 126/25 B, 25 R

[56] References Cited

U.S. PATENT DOCUMENTS

| | | | |
|---|---|---|---|
| 3,499,399 | 3/1970 | Kaufmann | 126/25 B |
| 4,311,130 | 1/1982 | Noose | 126/25 B |
| 4,331,125 | 5/1982 | Storandt | 126/25 B |
| 4,461,270 | 7/1984 | Sutter | 126/25 B |
| 4,603,679 | 8/1986 | Ogden | 126/25 B |

*Primary Examiner*—Larry Jones

*Attorney, Agent, or Firm*—Eckert Seamans Cherin & Mellott

[57] ABSTRACT

The present invention provides a device for use in preparing lighted briquettes in the tray of a barbecue which comprises a rectangular sheet of bendable fire resistant material suitably a metal such as aluminum having a plurality of spaced holes extending over the surface thereof of said sheet in the operative condition of the device being in the form of a bent hollow open-ended cylinder and in the storage condition thereof being in substantially flat form said sheet being changeable from the operative condition to the storage condition by bending of the sheet to the essentially flat form and said sheet being changeable from the storage to the operative condition by bending of the sheet to the hollow cylindrical form.

8 Claims, 3 Drawing Sheets

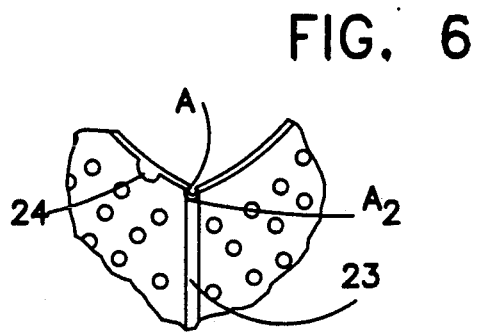
FIG. 6
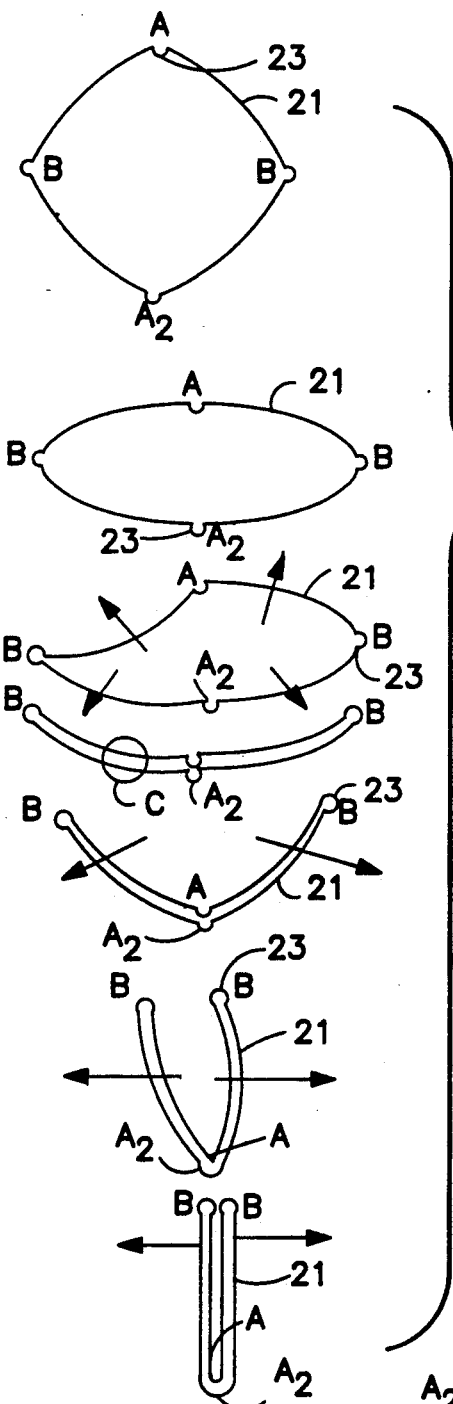
FIG. 8
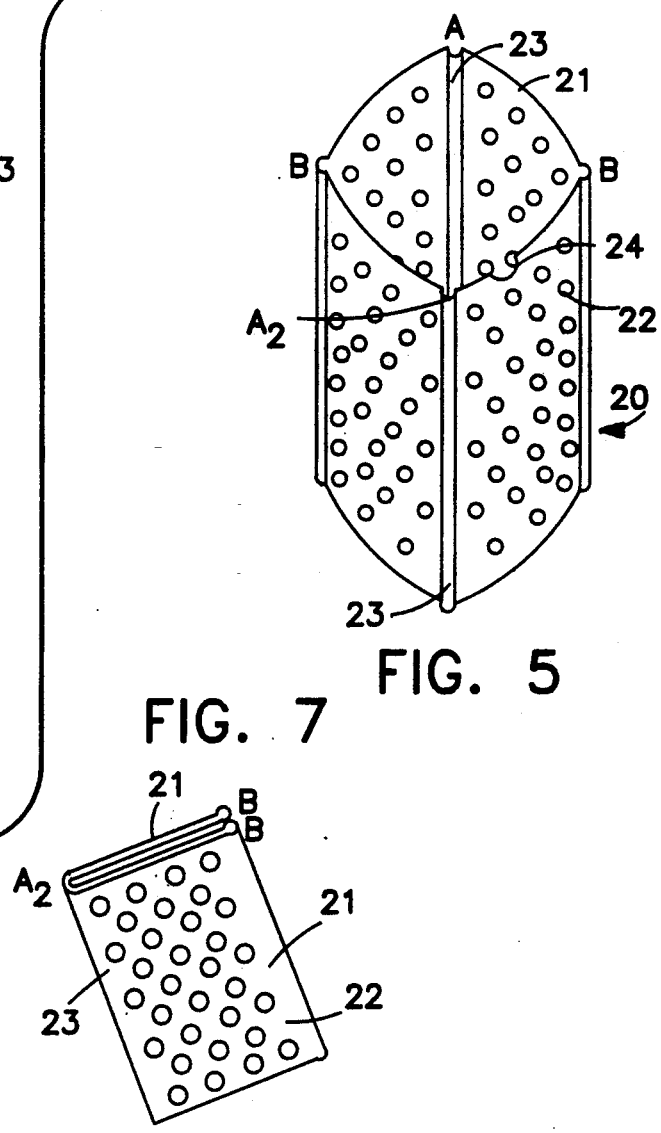
FIG. 5
FIG. 7

BARBECUE BRIQUETTE BOOSTER

BACKGROUND OF THE INVENTION

1. Field of Invention

The present invention relates to a device primarily for use in lighting barbecue briquettes in the tray of a barbecue. In particular the present invention relates to such a device which speeds up the process of lighting such barbecue briquettes. The device of the present invention also allows for the lighting of safe fires such as in the countryside and is easily portable and packable.

2. Description of Prior Art

The initial lighting of charcoal briquettes in the tray of a barbecue has been found to take considerable time. Attempts have been made to speed up this process. Thus, in U.S. Pat. No. 4,130,103 there is disclosed a device to facilitate the igniting and handling of fuel briquettes comprising an outer stiff wire mesh basket body serving as a primary support for briquettes, an interior finer wire mesh liner for said outer basket body to retain small briquette particles within the device during use thereof, the interior wire mesh being of a double thickness and the liner being telescoped into the basket body in the assembled device with a carrying handle for the device on the side wall thereof and a heat shield panel on the side wall of the device adjacent to the handle to protect the hand of the user of the device, the heat shield panel being positioned within the outer wire mesh and the thickness of the interior wire mesh said outer basket body and said liner being substantially cylindrical and opened at their tops and having superimposed bottom walls.

In South African Pat. No. 860/0895, there is disclosed a method, kit and device for preparing glowing coals from burning charcoal lumps or briquettes for a barbecue in which the method comprises initiating the charcoal fire in a foraminous cylinder which is open at both ends and which is located to extend upwardly in a coal tray or drum of a barbecue and when the charcoal is burning to a desired degree, removing the cylinder from the barbecue, while allowing the burning charcoal coals to remain in the tray or drum of the barbecue. Such a foraminous cylinder in which the glowing coals are prepared provides easier access of the air to the burning charcoal lumps as well as providing a chimney effect to enhance the charcoal combustion. Such prior art devices are bulky and do not lend themselves to camping applications, where the size and weight of equipment that can be carried is often limited.

SUMMARY OF INVENTION

The present invention provides an improvement in such devices and in particular provides a device which is useful in making fires and in particular in the speeding up of the process of lighting charcoal briquettes in a barbecue tray but at the same time is easily storable in a flat form.

According to the present invention there is provided a device for facilitating the starting of solid fuel fires, such as barbecues and the like, comprising a plurality of like laterally adjacent elongate panels with contiguous side edges, said panels being of fire resistant material and having a plurality of spaced holes therein; and stiff hinge means joining adjacent panels along their contiguous side edges, said stiff hinge means permitting the configuration of said device to be transformed between a stable operative position in which said panels form a hollow open-ended cylinder capable of providing a chimney effect to enhance combustion of the sold fuel and a substantially collapsed position in which the panels lie substantially flat in superimposed relationship.

Suitably the panels are corrugated which adds flexibility and strength and facilitates the formation of the open ended cylinder. Desirably the panels are multi-ply such as 2-ply and provided along their longitudinal edges with a folded bead to avoid sharp edges.

For storage once the cylinder has cooled after use, the cylinder and panels are then bent into their flat substantially uniplanar form.

In one embodiment of the invention there is provided a device for facilitating the starting of solid fuel fires, such as barbecues and the like, comprising a plurality of like laterally adjacent elongate panels with contiguous side edges, said panels being of fire resistant material and having a plurality of spaced holes therein; and stiff hinge means joining adjacent panels along their contiguous side edges, said stiff hinge means permitting the configuration of said device to be transformed between a stable operative position in which said panels form a hollow open-ended cylinder capable of providing a chimney effect to enhance combustion of the sold fuel and a substantially collapsed position in which the panels lie substantially flat in superimposed relationship. The narrow arcuate strips tend to act as hinges to facilitate the bending of the sheet and allow for said repeated bending of the sheet without straining the metal or allowing the sheet to break.

Suitably the sheet of fire resistant material is a metal sheet, such a aluminum sheet having holes extending both laterally and longitudinally thereof in suitably staggered lines, the sizes of the holes may vary in shape or size but are such as to remain smaller than the sizes of the barbecue briquettes. Desirably the holes are larger in the outermost regions with a longitudinally extending line of smaller holes in the center to provide for optimal efficiency for the device and the chimney effect and at the same time for optimal life of the device.

The sheet whether one-ply or multiple should be thin enough to facilitate bending of the sheet but at the same time should be thick enough to reverse bending of the device. Suitably the sheet is of the order of a few thousandths of an inch thick.

DESCRIPTION OF DRAWINGS

The present invention will be further illustrated by way of the accompanying drawings in which:

FIG. 5 is a perspective view of a device according to further embodiment of the present invention in the operative condition.

FIG. 6 is an enlarged detail shown in the circle c in FIG. 8(4) of the device of FIG. 5.

FIG. 7 is a perspective view of the device of FIG. 5 in the storage condition; and FIGS. 8(1) through 8(8) are schematics showing the changing of the device of FIGS. 5 through 7 from the storage to the operative condition and vice versa.

DETAILED DESCRIPTION OF THE PREFERRED EMBODIMENTS

Figure 1:
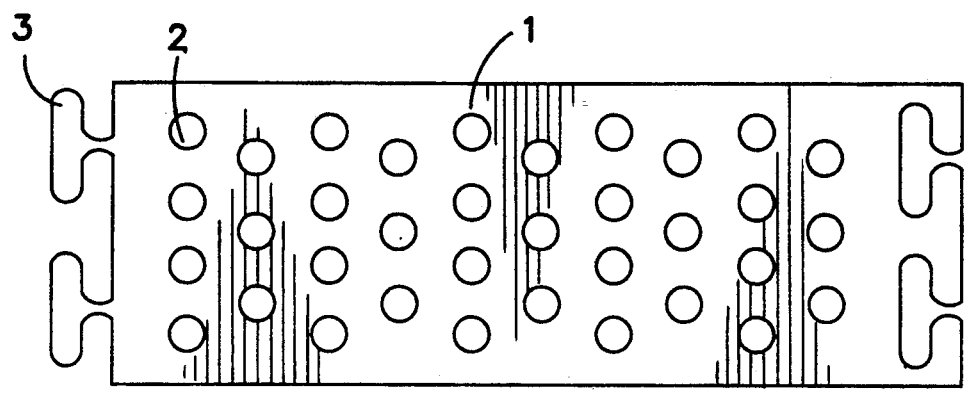
FIG. 1 is a side view of a device for facilitating the starting of barbeque fires in its storage form.
Figure 2:
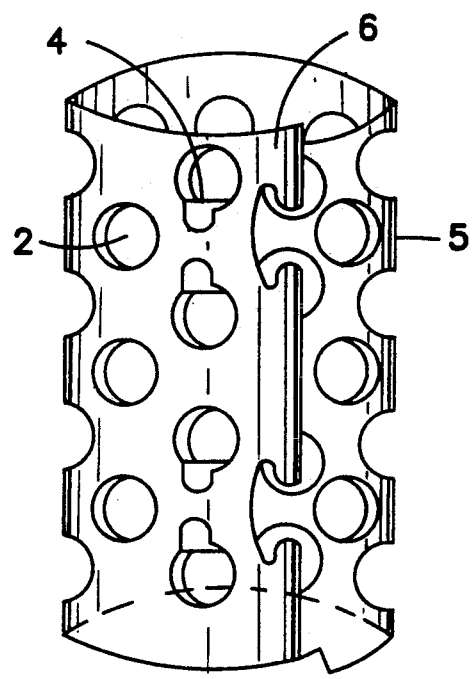
FIG. 2 is a side elevation of the device in its operative form.

Referring to the drawings, the device comprises a rectangular sheet 1 of tempered aluminum, suitably having a thickness of a few thousandths of an inch, such as 5-10 thousandths of an inch having a plurality of staggered lines of holes 2 extending both laterally and longitudinally on the sheet 1. Disposed on the ends of the sheet are T-shaped double lobed lug portions 3 which as shown in FIG. 2 in the operative condition of the device extend through holes 2 in adjacent ends of the sheet 1 and are bent over at 4 to form hooks for releasably fastening the sheet 1 to form the open ended cylinder 5. The conversion of the planar condition of FIG. 1 of the sheet to the cylindrical form in FIG. 2 is effected by simple bending so that the ends of the sheet 1 overlap at 6. This form of fastening means is very simple to manufacture as will be explained below.

Figure 3:
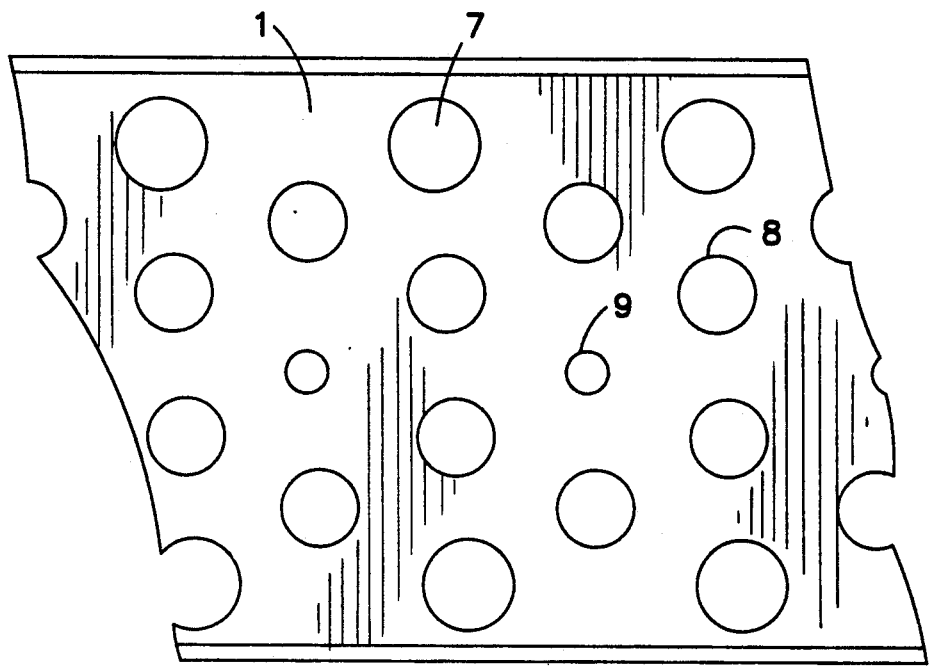
FIG. 3 is a detail of the sheet according to an embodiment of the present invention.

Referring to FIG. 3 the size of the holes 7 in the outer parts of the sheet 1 and thus the upper and lower ends of the cylinder are larger than the inner holes 8 with a center line of small holes 9 at the center. Thus the holes in the sheet grade down in size from the upper and lower ends of the cylinder 5 to the center. Suitably the larger holes 9 are sufficiently small to minimize risk of injury to the fingers. The larger diameter holes 7 at the bottom of the cylinder 5 are desirable to allow greater air flow at the base of the cylinder 5. Ideally for the chimney effect the air holes should gradually diminish in size from bottom to top. However as the top and bottom of the cylinder are similar it is possible to extend the life of the device by having the air holes graded downwardly only to the center of the cylinder 5 whereby the cylinder 5 can be reversed in use as the bottom of the cylinder tends to burn out with time. The sheet has its longitudinal edges 10 bent over to avoid sharp edges.

Figure 4:
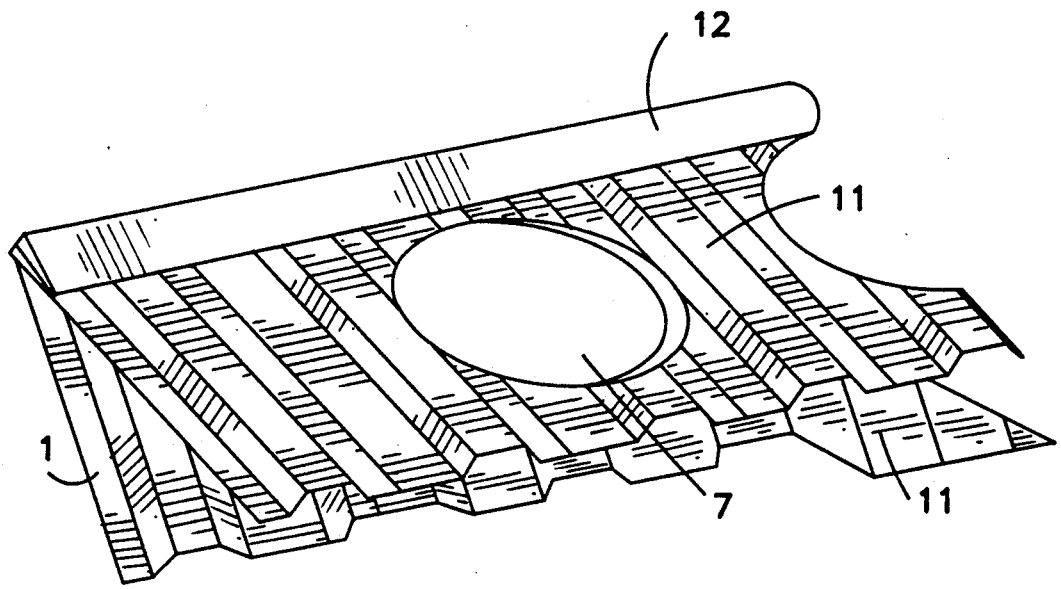
FIG. 4 is a detail of the upper end of the sheet according to a further embodiment of the present invention.

Referring to FIG. 4 the sheet 1 is a 2-ply sheet each ply 11 being corrugated for flexibility and strength and has its upper and lower ends folded over to form a folded bead 12.

In making the device of FIGS. 1 through 4 a continuous strip of aluminum is continuously passed from a roll between rollers for die-cutting the holes. The strip may be of multi breadth and subsequently cut into single strips. The longitudinal edges of the strip may be folded over to avoid sharp edges. The strip may also be corrugated by passing between corrugating rolls for added strength. Then the fastening means may be die cut transversely into the male and female complementary forms in a single stroke of a die cutting machine.

Referring now to FIGS. 5 through 8 the device in the operative condition thereof comprises as shown in FIGS. 5 and 8(7), a sheet 20 of tempered aluminum approximately 7 thousands of an inch thick, although other fire resistant bendable materials may be used, having four similar outwardly arcuate panels 21 having holes 22 therein of a similar configuration as shown in FIGS. 1 through 4 with narrow rectangular laterally extending longitudinally arcuate strips 23 therebetween of small radius of curvature forming an open-ended cylinder, one pair of diametrically opposite strips B being outwardly arcuate and of the other pair of strips one $A_2$ is outwardly arcuate and the other A is inwardly arcuate. In the storage condition as shown in FIGS. 7 and 8(1) the device has four panels 21 which are flat and in superposed pairs and are connected in individual pairs at one end by the strips B and at their other end by the strips A and $A_2$.

Referring now to FIG. 8, the device in its storage condition as shown in FIG. 8(1) and FIG. 7 is changed into its operative condition as shown in FIG. 5 and FIG. 8(7) by firstly bending the panels of the device of the configuration shown in FIG. 8(1) and in the direction of the arrows to form a V-shape as shown in FIGS. 8(2) with arcuate panels 21. The strips 23 serve as stiff hinges. The bending continues as shown in FIGS. 8(3) and 8(4) in the direction of the arrows in FIGS. 8(2) and 8(3) and the contiguous arcuate panels 21 are separated as shown in FIG. 6 by bending the panels 21 away from each other, panels 21 being separated from the layered form by means of an index tab or cut-out 24 as shown in FIG. 6. The bending of the panels 21 is continued until the configuration as shown in FIG. 8(7) is achieved whence the device is in its operative condition. Reverse procedure is adopted for storage from the condition shown in FIG. 8(7) to the condition shown in FIG. 8(1) with the strip A being accommodated within the strip $A_2$.

Thus, the device of the present invention is simple to manufacture, is easily storable in its flat condition and may be readily assembled into its operative condition by simply bending the sheet into open ended cylindrical form and fastening the cylindrical releasably by fastening the lobes of the lugs through the holes in the adjacent cylindrical wall and bending over the lobes.

Whilst the device of the present invention is primarily for use in lighting barbecues it may also be used independently as a portable safe fire device for camping, back-packing, sea-travel and walks especially during brush fire warning periods. It is lightweight, cools in 20 seconds, and packs flat. It may also be used for example in emergency situations, refugee camps and military manoeuvres.

I claim:

1. A device for facilitating the starting of solid fuel fires, such as barbeques and the like, comprising four like panels, adjacent edges of the panels having extending laterally thereacross a narrow rectangular strip of small radius of curvature, each said panel being of bendable fire resistant material and having a plurality of spaced holes extending over the surface thereof, said panels in the operative condition of the device forming a bent hollow open-ended cylinder with said panels outwardly arcuate and with three of said strips outwardly arcuate and one of said strips inwardly arcuate and in the storage condition of the device being in substantially superposed pairs of flat panels, said device being changeable from said operative condition to the storage condition by bending said one pair of adjacent panels between which is disposed the inwardly arcuate strip about a pair of diametrically opposite outwardly arcuate strips so as to lie contiguous with the other pair of adjacent panels and bending the contiguous pairs of panels about the strips therebetween with straightening by bending of the panels to lie flat and contiguous with each other and said sheet being changeable from the storage condition to the operative condition by reversal of the procedure.

2. A device as claimed in claim 1 in which the panels are made of metal.

3. A device as claimed in claim 1 in which the panels are made of aluminum.

4. A device as claimed in claim 1 in which the holes are in rows extending both laterally and longitudinally of the panels.

5. A device as claimed in claim 4 in which the rows are staggered.

6. A device as claimed in claim 4 or 5 in which the holes are of different sizes but the uppermost and lowermost holes are the largest and with a central longitudinal line of small holes therein.

7. A device as claimed in claim 1, 2 or 3 in which the sheet is corrugated.

8. A device as claimed in claim 1, 2 or 3 in which the sheet is two-ply with folded beads along the longitudinal edges thereof.

* * * * *